(No Model.) 2 Sheets—Sheet 1.

F. & L. WINKLER.
SPRINKLER HEAD.

No. 538,992. Patented May 7, 1895.

Witnesses:
M. E. Fowler
James R. Mansfield

Inventors:
F. Winkler
L. Winkler
By their Attorneys: Alexander & Dowell (No Model.) 2 Sheets—Sheet 2.
F. & L. WINKLER.
SPRINKLER HEAD.
No. 538,992. Patented May 7, 1895.
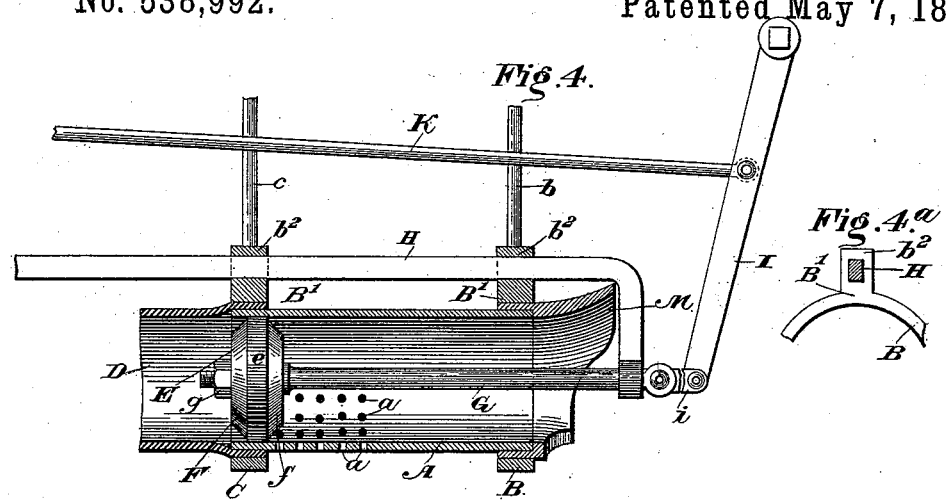
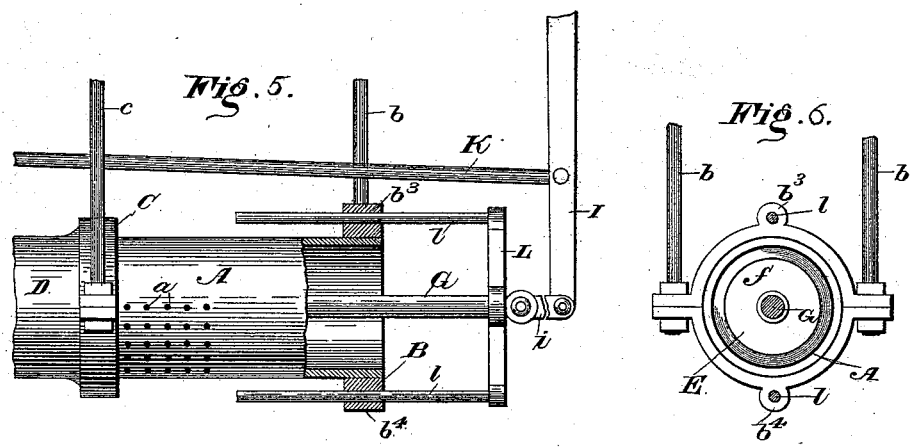
Witnesses:
M. E. Fowler
Junius R. Mansfield
Inventors.
F. Winkler and
L. Winkler
By their Attorneys, Alexander & Dowell

UNITED STATES PATENT OFFICE.

FRED WINKLER AND LENHART WINKLER, OF SOUTH BEND, INDIANA.

SPRINKLER-HEAD.

SPECIFICATION forming part of Letters Patent No. 538,992, dated May 7, 1895.

Application filed April 15, 1893. Serial No. 470,556. (No model.)

*To all whom it may concern:*

Be it known that we, FRED WINKLER and LENHART WINKLER, of South Bend, in the county of St. Joseph and State of Indiana, have invented certain new and useful Improvements in Sprinkler-Heads; and we do hereby declare that the following is a full, clear, and exact description thereof, reference being had to the accompanying drawings, and to the letters of reference marked thereon, which form part of this specification.

Figure 1:
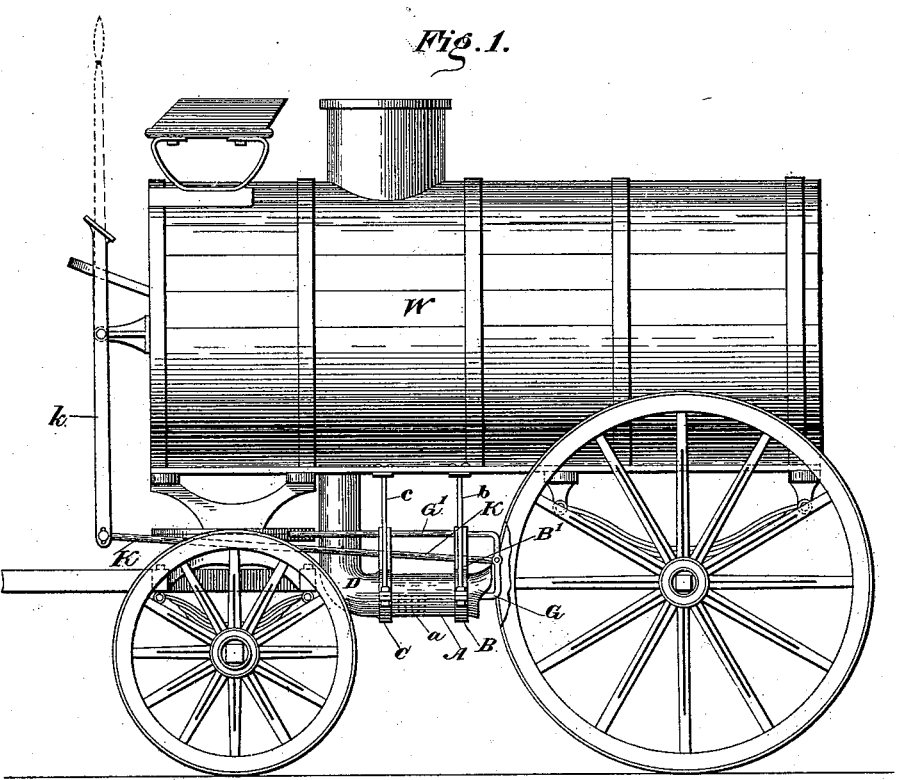
Figure 2:
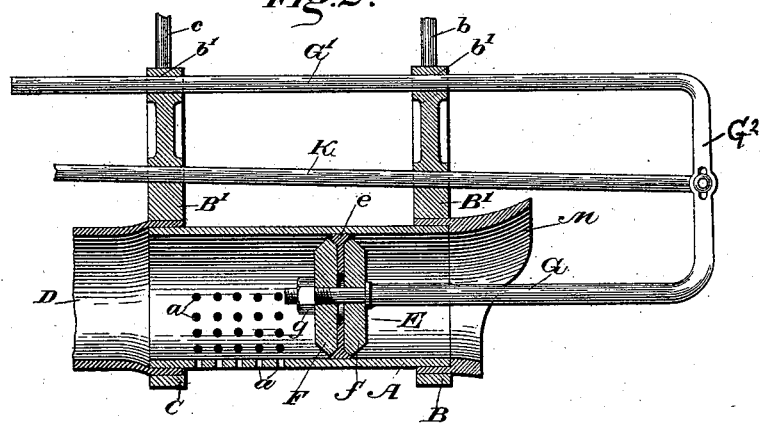
Figure 3:
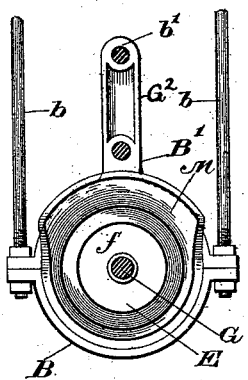

Figure 1 is a side view of our improved sprinkler-head and mechanism for operating the piston attached to a wagon-tank. Fig. 2 is a longitudinal vertical central sectional view of the sprinkler-head. Fig. 3 is an end view thereof. Fig. 4 is a detail longitudinal section through a modified form of the head. Fig. 4$^a$ is a detail of part of Fig. 4. Fig. 5 is a detail partly-sectional side view of another modification. Fig. 6 is a detail.

This invention is an improvement in sprinkler heads for street sprinkling machines, and its objects are to enable the head to be readily cleansed, and to simplify the construction of parts, and it consists in the novel construction and combination of parts hereinafter described and claimed.

Referring to the drawings by letters, A designates a cylinder open at both ends and supported by split rings B, C, suspended by rods $b$, $c$, from the tank body W. One end of the cylinder communicates by a pipe D with the interior of the tank and receives water therethrough and near this end the cylinder is numerously perforated as at $a$ for spraying the water. The piston E in the cylinder is preferably formed, as shown, of two disks F, $f$, mounted on the end of the piston rod G, the rear disk $f$ being held stationary by abutting against a shoulder or collar on the rod, and the front disk F being adjustable toward disk $f$ and held thereto by a nut $g$ screwed onto the threaded inner end of the piston rod, as shown. The disks F and $f$ are oppositely beveled on their peripheries and an expansible packing ring, $e$, of rubber or other suitable material is clamped between them, and expanded, by forcing the disks together until the piston fits closely and water tight within the cylinder.

As shown in Figs. 1 and 2 the piston rod G extends outside the cylinder and is bent forward over the cylinder. The upper portion G' of the rod passes through guide openings $b'$, $b'$, in posts $b$ on top of the split rings. The upper portion G' of the rod is longer than the portion to which the piston is attached so that the piston can be drawn out of the cylinder, and yet be suspended in position to re-enter the same.

A rod K is pivotally connected to the vertical part G$^2$ or bend of piston rod G at one end, and to a foot and hand lever $k$ at the front end of the tank, in convenient position to be operated by the driver who thus controls the sprinkling, and washing out of the tank, as by moving the piston back sufficiently to uncover the openings in the cylinder the water escapes through the openings $a$, and by drawing the piston farther backward and out of the cylinder the water in the tank is allowed to escape in volume, and wash out the sprinkler head and tank by carrying out all large impurities that might otherwise choke the openings $a$. The driver can then move the piston back into the cylinder by reversing the movement of the lever $k$, and thus has the entire control of the piston without leaving his seat.

As shown in Figs. 4 and 4$^a$ the piston rod is straight but is rigidly connected at its rear end to the end of a bar H which is bent at right angles and its longest portion lies parallel with the rod but exterior to the cylinder and passes through guide slots in studs $b^2$ on the upper part B' of the split ring hangers, as shown. Bar H is shown angular in cross section, so that lateral swing of the piston will be prevented. In this construction the outer end of the piston is connected by a link $i$ to the lower end of a lever I which should be pivoted at its other end to some suitable point on the tank or running gear. The rod K is connected to lever I, and thus the piston can be shifted and controlled as before.

To the outer end of the piston rod as shown in Fig. 5 is attached a cross bar L, and to the extremities of this bar are attached the ends of guide rods $l$, $l$, which play through guide eyes or bearings $b^3$, $b^4$, on the top and bottom of the hangers B, as shown, said rods reciprocating longitudinally of and exterior to the cylinder as the piston reciprocates therein.

The end of the piston rod is connected by a pivoted link i to the lower end of a suspended lever I as in Figs. 4 and 5, and may be swung back and forth by a rod K which is connected by one end thereto and may be connected by its other end to a foot lever at the front of the tank, where (on a street sprinkling machine) it can be operated by the driver's foot, or hand, as above mentioned. By these several constructions the piston is kept in the proper axial position within the cylinder, and prevented vibrating either laterally or up and down when the piston rod is shifted, as it would otherwise naturally do. Thus the wear and peripheral strain on the piston, which would occur if the rod vibrated, are prevented.

The rear, open, end of the cylinder is provided with a flange M which flares upwardly and rearwardly, and extends nearly or entirely around the end of the cylinder, but is wider at the top and sides than at the bottom. This flange prevents the water dashing up, or laterally, when the piston is drawn out of the cylinder, and facilitates the replacing of the piston in the cylinder. The flange may be formed integral with the cylinder, or separate, and secured thereto, as indicated in the drawings.

It will be observed that the cylinder is open at its rear end and that the entire device can be quickly taken apart or put together, and what is of most importance that the piston can be entirely withdrawn from the cylinder whenever it is desired to wash out the sprinkler head or cleanse its perforations, and can be immediately replaced when desired as it is suspended opposite the open end of the cylinder when removed therefrom.

Having thus described our invention, what we claim as new, and desire to secure by Letters Patent thereon, is—

1. The combination of the cylinder, the piston therein, the piston rod, the supporting device connected to the said rod, and guides therefor exterior to the cylinder, substantially as and for the purpose described.

2. The combination of the cylinder, its hangers, the piston in the cylinder, and the piston rod, and the piston support and guide playing in guides on the hangers and connected to the piston rod, substantially as described.

3. The combination of the open-ended cylinder, the piston rod, the disks F, f, on the inner end of said rod having their peripheries oppositely beveled on their meeting faces, the expansible disk interposed and clamped between the beveled peripheries of said disks, the inner disk abutting against a shoulder on the rod and the nut on the end of the rod for forcing and holding said disks together and the supports and guides for the piston rod, all substantially as described.

4. The combination of the open ended sprinkling cylinder, the piston therein bodily removable therefrom, and the supporting devices for the piston substantially as described exterior to the cylinder connected to said piston and supplying bearings for the piston rod, one of which is outside the cylinder, as and for the purposes described.

5. The combination of the open ended sprinkling cylinder, the hood on the open end thereof, the piston in the cylinder, and the supporting devices for the piston substantially as described exterior to the cylinder connected to the piston rod and supplying bearings for the piston rod one of which is outside the cylinder, as and for the purpose described.

6. The combination of the cylinder, the piston therein, the piston rod, the bar connected to the outer end of said piston rod, and the guide rods connected thereto and playing through guide eyes exterior to the cylinder; with the water supply pipe communicating with the cylinder, and devices for shifting said bar, substantially as described.

7. The combination of the tank, the open ended cylinder having perforations near one end, a removable piston therein, a piston rod, a swing lever, and a rod pivotally connected to said lever and piston rod; with a water supply pipe connected to the perforated end of the cylinder, and the piston rod support connected to the outer end of the piston rod, and playing through guides exterior to the cylinder, substantially as and for the purpose specified.

In testimony that we claim the foregoing as our own we affix our signatures in presence of two witnesses.

FRED WINKLER.
LENHART WINKLER.

Witnesses:
   JAMES DU SHANE,
   H. H. HUMPHREY.